(12) United States Patent
Barott

(10) Patent No.: US 9,369,160 B2
(45) Date of Patent: Jun. 14, 2016

(54) COMMUNICATIONS SYSTEM USING SIGNAL MODULATION

(71) Applicant: Embry-Riddle Aeronautical University, Inc., Daytona Beach, FL (US)

(72) Inventor: William C. Barott, Port Orange, FL (US)

(73) Assignee: Embry-Riddle Aeronautical University, Inc., Daytona Beach, FL (US)

(*) Notice: Subject to any disclaimer, the term of this patent is extended or adjusted under 35 U.S.C. 154(b) by 0 days.

(21) Appl. No.: 14/702,367

(22) Filed: May 1, 2015

(65) Prior Publication Data

US 2015/0318881 A1 Nov. 5, 2015

Related U.S. Application Data

(60) Provisional application No. 61/987,553, filed on May 2, 2014.

(51) Int. Cl.
| | |
|---|---|
| H04B 1/04 | (2006.01) |
| H04B 1/12 | (2006.01) |
| G01S 13/74 | (2006.01) |
| H04B 1/10 | (2006.01) |
| H04L 27/00 | (2006.01) |

(52) U.S. Cl.
CPC ............... *H04B 1/04* (2013.01); *H04B 1/0475* (2013.01); *H04B 1/10* (2013.01); *H04B 1/1027* (2013.01); *H04B 1/12* (2013.01); *H04L 27/0012* (2013.01)

(58) Field of Classification Search
CPC .......... G01S 13/003; G01S 2013/0281; G01S 13/751; G01S 13/765
See application file for complete search history.

(56) References Cited

U.S. PATENT DOCUMENTS

| | | | | |
|---|---|---|---|---|
| 6,424,290 | B1* | 7/2002 | O'Neil et al. | 342/55 |
| 2002/0167440 | A1* | 11/2002 | Baugh | 342/159 |
| 2007/0188377 | A1* | 8/2007 | Krikorian | G01S 13/52 342/160 |
| 2009/0195365 | A1* | 8/2009 | Peczalski et al. | 340/10.5 |
| 2010/0085243 | A1* | 4/2010 | De Gramont et al. | 342/175 |
| 2011/0260910 | A1* | 10/2011 | Gravelle | G01S 13/751 342/118 |
| 2012/0256730 | A1* | 10/2012 | Scott et al. | 340/10.1 |
| 2014/0225761 | A1* | 8/2014 | Garrec et al. | 342/33 |

OTHER PUBLICATIONS

Pavel BezouŠek and Vladimír Schejbal, "Bistatic and Multistatic Radar Systems", University of Pardubice, Czech Republic, Radioengineering, vol. 17, No. 3, Sep. 2008.*

(Continued)

*Primary Examiner* — Aristocratis Fotakis
(74) *Attorney, Agent, or Firm* — Womble Carlyle Sandridge & Rice, LLP

(57) ABSTRACT

A communication method and system for communication utilizing modulation of digital signals, such as by targets and/or by use of low-complexity tags is presented. Targets may include any device or object that may alter signals, and tags can include a device with the ability to reflect and/or alter the properties of the signals and, in doing so, impose specific modulations on or alterations of such signals. Modulations can be sensed or detected using a receiver or receivers implementing processing algorithms derived from passive radar detection operations or other processes.

14 Claims, 11 Drawing Sheets

(56) References Cited

OTHER PUBLICATIONS

Ratnasingham Tharmarasa, Thia Kirubarajan and Mike McDonald, "Passive Multitarget Tracking Using Transmitters of Opportunity", Proceedings of the 2009 IEEE Symposium on Computational Intelligence in Security and Defense Applications (CISDA 2009), IEEE.*

Michael Inggs, Yoann Paichard, Gunther Lange and Michael Inggs, "Passive Coherent Location System Planning Tool", University of Cape Town, Advanced Computer Engineering Laboratory Centre for High Performance Computing, South Africa, Nov. 2009.*

Chenming Zhou and Joshua D. Griffin, "Accurate Phase-Based Ranging Measurements for Backscatter RFID Tags", IEEE Antennas and Wireless Propagation Letters, vol. 11, 2012.*

* cited by examiner

COMMUNICATIONS SYSTEM USING SIGNAL MODULATION

CROSS REFERENCE TO RELATED APPLICATIONS

The present patent application is a formalization of previously filed, U.S. Provisional Patent Application Ser. No. 61/987,553, filed May 2, 2014 by the inventors named in the present application. This patent application claims the benefit of the filing date of this cited Provisional Patent Applications according to the statutes and rules governing provisional patent applications, particularly 35 U.S.C. §119(e), and 37 C.F.R. §§1.78(a)(3) and 1.78(a)(4). The specification and drawings of the Provisional Patent Application referenced above are specifically incorporated herein by reference as if set forth in their entirety.

BACKGROUND

The ubiquity of wireless devices and the finite radio spectrum present a disparity between the availability of, and demand for, wireless access. New technologies should be able to efficiently use the spectrum of transmission frequencies and/or operate as non-interfering secondary users in existing spectrum. Personal area networks include examples of such technologies and usually exhibit modest bitrates and short ranges. However, a need exists for communications systems that can operate over various areas or ranges, including larger areas or ranges, and which address the foregoing and other problems in the art.

SUMMARY

Briefly described, embodiments of the present application are directed to a communications method and system for communication utilizing modulation of transmitted signals such as from a nearby transmitter of opportunity, which, in one example embodiment, can comprise digital television signals, by targets and/or by use of low-complexity tags. Targets can include any device(s) or object(s) that may alter signals. Tags can include devices with the ability to reflect and/or alter the properties of the signals and, in doing so, impose specific or recognizable modulations on or alterations of such signals. These modulations can be sensed or detected using a receiver or receivers implementing processing algorithms derived from passive radar detection operations or other processes. The use of coherent processing can, for example, significantly increase the effective range of the detected ambient backscatter signals. Furthermore, the use of television transmitters, for example, can eliminate use of a separate or dedicated radar transmitter, thus resulting in a lower-cost system.

Various features, objects and advantages of aspects of the present invention will become apparent to those skilled in the art upon a review of the following detailed description, when taken in conjunction with the accompanying drawings.

Figure 1:
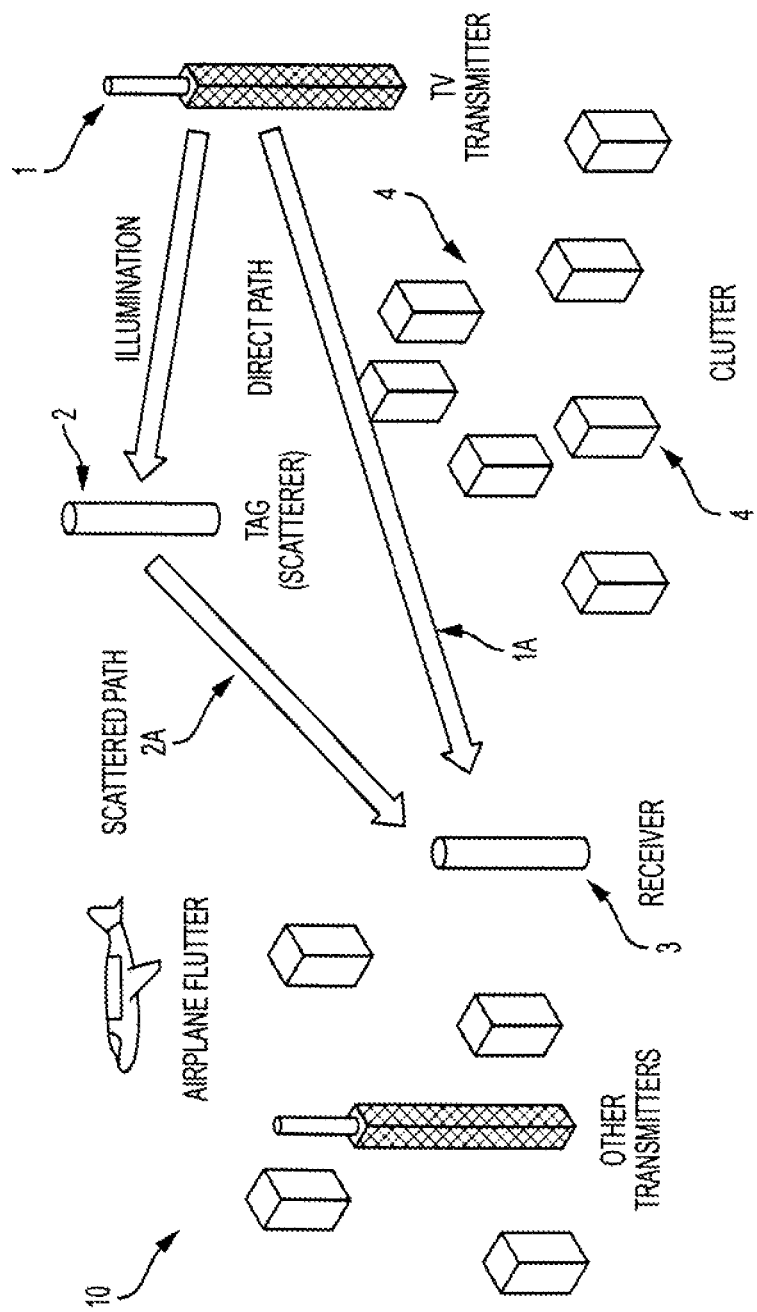
FIG. 1 is a schematic view of one example of a communication system according to embodiments of the present invention.

It will be understood that the drawings accompanying the present disclosure, which are included to provide a further understanding of the present disclosure, incorporated in and constitute a part of this specification, illustrate various aspects, features, advantages and benefits of the present disclosure and invention, and together with the following detailed description, serve to explain the principles of the present invention. In addition, those skilled in the art will understand that, according, in practice, various features of the drawings discussed herein are not necessarily drawn to scale, and that dimensions of various features and elements shown or illustrated in the drawings and/or discussed in the following Detailed Description, may be expanded reduced or moved to an exploded position in order to more clearly illustrate the principles and embodiments of the present invention as set forth in the present disclosure.

DETAILED DESCRIPTION

Referring now to the Figures, the embodiments of the present invention are directed to systems and methods for communications/transmissions that can be sent using modulation of digital signals, and which generally operate by merging communications concepts with "passive radar" concepts. Embodiments of the present invention can exploit ambient illuminators of opportunity, such as ambient television signals or similar digital transmission signals, for backscatter communications and detection of aircraft or other, similar aerial vehicles. Coherent processing can be used to identify the presence of a scattered target signal in the presence of clutter, noise, and interference, and targets can be detected at a significant range from the receiver. In one aspect, embodiments of the present invention reduce the cost of the communication system as compared to traditional radar transmission communication systems by not including a dedicated radar transmitter. Furthermore, use of the systems and methods according to embodiments of the present invention may reduce the need for radar allocations in the radio spectrum, permitting reallocation of these bands to wireless services.

An example embodiment of a communications system 10 for backscatter transmission/communication detection according to the principles of the present application is schematically shown in FIG. 1. Principal elements of the communications system 10 may include a transmitter of opportunity 1, a desired target (hereafter the tag) 2, as well as clutter 4 and other interferers. The receiver 3 captures signals and reflections from each of these and can isolate and identify the scattered signal from the tag. As further indicated in FIG. 1, in one embodiment, the system 10 can include a transmitter 1 capable of generating or supplying digital transmission signals 1A; a signal scatterer device, target or tag 2, which may alter the digital transmission signals 1A, including being configured to selectively alter the properties of the digital transmission signals 1A, for generating a scattered path 2A; and a receiver 3 at which the digital transmission signals are detected/received, including the signals 1A received directly from the transmitter 1 and/or the scattered path 2A signals received from the target and/or tag 2.

The transmitter 1 generally can include a transmitter-of-opportunity, such as an existing television (TV), digital radio or other, similar transmission device, which illuminates the scene with a signal or array of transmitted signals, e.g. with radio frequency (RF) flux. By way of example only, the transmitter 1 can generate radio signals, which are incident on the tag 2 and receiver 3, and the transmitter 1 can be digital television (DTV) station following the Advanced Television Standards Committee (ATSC) standard adopted in North America. However, the presented concepts are applicable to any transmitter and/or other illuminator sharing favorable characteristics, which also may include transmitters emitting spaceborne signals and/or transmitters on spacecraft, satellites, space stations and/or other extraterrestrial transmitters. Indeed, the systems and methods according to concepts of the present application can be applied to a variety of transmitter types, e.g. FM radio, DVB-T, ATSC, GSM, Wi-Fi, radio navigation aids, Iridium spacecraft, XM Radio spacecraft, as well as transmissions of alternative electromagnetic waves (e.g., visible or other light), and/or alternative selections of signal-bearing waves and media (e.g., acoustic or seismic waves in all forms of matter).

A target 2 also generally may include any physical device or object (e.g., antennae, land vehicles, air or aerospace vehicles, maritime vehicles, buildings or other structures, and/or electronic devices) capable of scattering, reflecting, retransmitting, and/or otherwise altering incident signals transmitted from the transmitter of opportunity 1. On the other hand, the use of a tag 2 generally can include any physical device or object capable of scattering, reflecting, retransmitting, and/or otherwise altering incident signals transmitted from the transmitter of opportunity with the additional ability to alter selectively the properties of the scattered, reflected, or retransmitted signal in response to a stimulus, input, and/or other property.

Figures 3A, 3B:
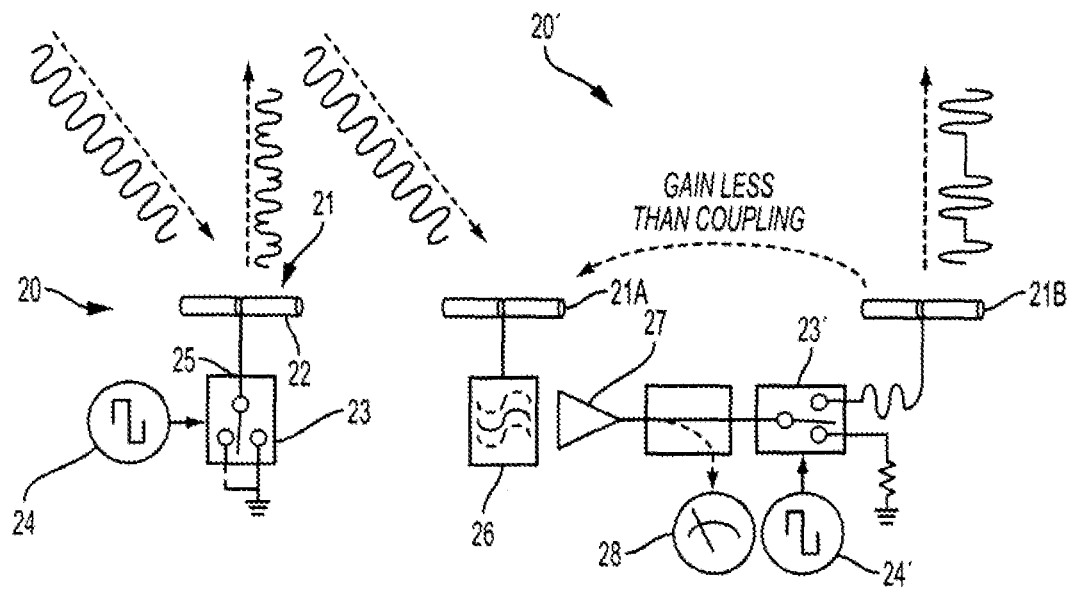
FIG. 3A is a schematic illustration of a passive tag for use in the communication system of FIG. 1.
FIG. 3B is a schematic illustration of a regenerative or active tag that can be used in the communication system of FIG. 1.

The tag 2 further consists of a passive tag 20 (FIG. 3A) and/or a regenerative/active (FIG. 3B) tag 20'. A passive tag 20 (FIG. 3A) may not require a transmitter of its own, and for embodiments where such a passive tag is detected/used, the communication system generally includes an antenna 21 with one or more terminals 22, where changes to the physical properties of the antenna 21, e.g., moving the one or more terminals 22, can change how waves generated by the transmitter 1, which are incident on the tag, are reflected from the tag. The antenna 21 can be a simple antenna, such as a mobile broadband discone, though embodiments of the present invention are not limited thereto and can include any suitable device for sufficiently reflecting waves or signals generated by the transmitter. The passive tag additionally may include an electronically-controlled load termination device 23 connected to the antenna and a controller 24 capable of modulating the load termination device. The electronically-controlled load termination device 23 further can be connected to a termination end 25 of the antenna 21 and can include a diode, an RF switch, and/or any other suitable device or devices capable of opening/closing the circuit of the antenna. The controller 24 can include a microcontroller or similar processor capable of alternating the electronically-controlled load termination device, e.g., an RF switch, between connections to an open circuit and a short circuit load. However, the controller 24 further may include any device or system of devices capable of manipulating the load termination device so that the transmitter waves incident on the passive tag 20 can be modulated.

Where a regenerative tag 20' is used, as shown in FIG. 3B, the communications system further can include additional circuitry configured to modify the scattered path signals beyond the application of modulation of the passive tag 20. For example, a regenerative/active tag 20' can amplify, increase, or otherwise alter the strength or other properties of the transmitted waves or signals incident on the regenerative tag 20' to allow, for example, detection of and/or communication with the regenerative tag 20' at increased distances in comparison with use of the passive tag 20. The regenerative tag 20' further can e capable of receiving transmitter waves or other ambient signals and modulating waves and/or signals prior to retransmission.

In embodiments designed to detect and communicate with a regenerative tag 20', the communications system generally can include one or more antennas 21A/B, a load termination device 23', and a controller 24'. Such a regenerative tag 20' detection system can include first antenna 21A, e.g., a mobile broadband discone or other suitable antenna, capable of and directed to receiving transmitter waves or other ambient signals incident on the regenerative tag, and can further include a second antenna 21B, e.g., a mobile broadband discone or other suitable antenna, which could be used to reradiate or otherwise regenerate the transmitter waves and/or other ambient signals received by the first antenna 21A. Additionally, the load termination device 23', such as a switch, e.g., an RF Switch, can be controlled by the controller 24', such as an Andrino Uno® microcontroller or any other suitable control device, to toggle the output between the second antenna 21B and a termination resister so as to implement a form of amplitude key shifting. For diagnostic purposes, a directional coupler can optionally be included with the regenerative tag. While a dual antenna configuration is presently discussed, a configuration with a single antenna also is possible and should be considered within the scope of embodiments of the present application.

The regenerative tag 20' detection system can further include one or more filters 26, e.g., a high pass filter and a low pass filter, that can comprise a bandpass filter, which in this example could be in the range of 500 MHz to 750 MHz. An amplifier 27 further can be included in the regenerative tag detection system to enhance the received transmission/tag signal. For example, an amplifier 27 can be selected/used to provide approximately 30 dB of gain or more, while consuming approximately 600 mW of power. One or more attenuators 28 further can be present in the regenerative tag to aid in preventing coupled oscillation due to the presence of the amplifier.

Figure 2:
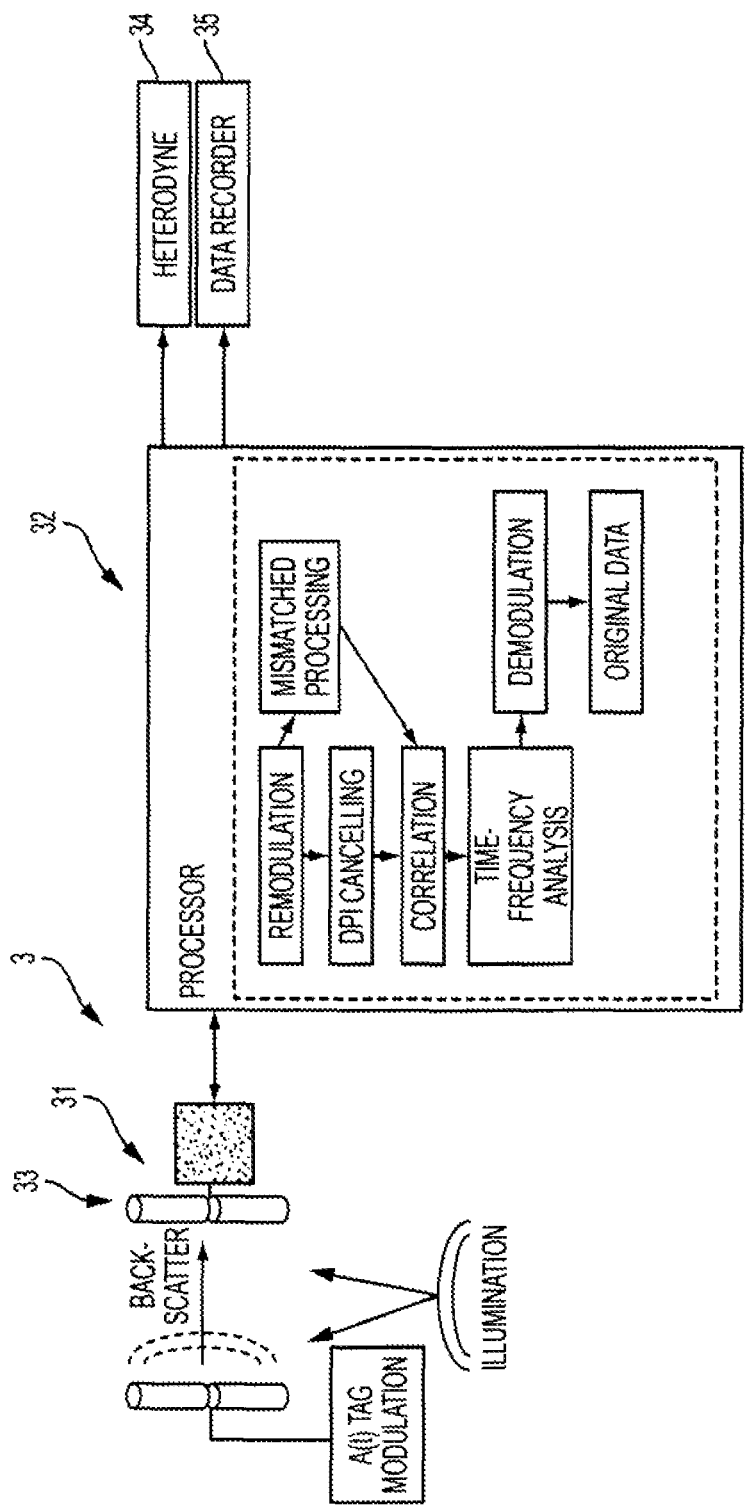
FIG. 2 is a schematic view of a receiver including a block diagram illustrating one embodiment of signal processing.

As generally shown in FIG. 2, in one embodiment, the receiver 3 can generally include a signal receiver 31 and a processor 32. The signal receiver 31 receives transmission signals from the transmitter 1 (FIG. 1), which can include both direct and scattered path transmissions 1A/2A as indicated in FIG. 1, and/or could be directly coupled to and/or be in communication with the processor 32, such as through a wireless connection, e.g., Wifi or RF signal, for communication of the received/detected transmission thereto. The signal receiver 31 further can include one or more antennas 33, such as a discone antenna, though the signal receiver can be any suitable device for receiving waves/ambient signals. In one aspect, as an example, the signal receiver 31 can receive signals from a distance of up to 1 km when using a passive tag 20 and/or from a distance of up to 100 km when using an active or regenerative tag 20'. The processor 32 also can include, or be in communication with, a data recorder 35, and output from the signal receiver can be delivered to the data recorder 35. The processor can further include, or be in communication with, a heterodyne 34 capable of cycling through various frequencies, such as various RF channels. As indicated in FIG. 2, the processor 32 can be capable of implementing/performing coherent processing of the data received from the transmitter 1 (FIG. 1) directly (as indicated by arrows 1A) and from the tag 2 via the scattered path 2A. The receiver 3 can be in communication with, or connected to, other communications equipment (e.g., radios, modems, smart phones, and/or other electronic devices), tracking equipment (e.g. air traffic control systems), localization equipment (e.g., a tag that does not require a self-contained electric power source, similar to a perpetual "emergency locator beacon" or its equivalent), and/or other data terminals.

For purposes of describing the signal processing operations of the communications system 10 according to embodiments of the present application, the signal radiated by the transmitter 1 (FIG. 1) or illuminator is represented as the reference signal, $r(t+\tau_D)$, where $r_D$ is the propagation time delay along the direct path to the receiver. Thus, the reference signal sampled by the receiver can be represented by $L_D r(t)$, where $L_D$ represents path loss.

The transmitted signal incident on the tag is represented by $A_I r(t+\tau_D-\tau_I(t))$ where the subscript I represents the illumination path illustrated in FIG. 1. The tag can be characterized by its average radar cross section σ (RCS) and scattering modulation function $A_{tag}(t+\tau_R)$, where $\tau_R$ represents the time delay of the reflection path. The function $A_{tag}$ includes both aspect-dependent variations in RCS as well as purposeful modulation imposed by the tag. Modulation could be generated by altering the tag's impedance so as to change the properties of the reflected signal, as shown in FIG. 2. The scattered signal as observed by the receiver is $s_{tag}(t)$, which can be represented by $s_{tag}(t)=A_{tag}(t)L_B r(t-\tau_B(t))$. The bistatic terms are given as the time delay $\tau_B(t)\tau_I(t)+\tau_R(t)-\tau_D$ and the loss $L_B=L_I L_R \sqrt{\sigma}$. In addition to the desired tag signal, K independent undesired scatterers are generalized as providing the observed signals $c_k(t)r(t-\tau_k(t))$.

The signal observed at the receiver is the composite of the direct path reference with the desired and undesired scattering and noise n(t), and can be written as the surveillance signal:

$$s(t) = L_D r(t) + A_{tag}(t)L_B r(t - \tau_B(t)) + \sum_k c_k(t)r(t - \tau_k(t)) + n(t). \quad (1)$$

Coherent signal processing, performed in accordance with embodiments of the present invention, includes a mechanism of obtaining an isolated copy of r(t). Embodiments of this invention adopts remodulation of s(t) for this purpose. Alternatively, a second antenna and radio at the receiver to sample the reference separately from the surveillance beam, or a cooperative transmitter can be implemented.

Passive Coherent Processing

FIG. 2 shows a simplified block diagram of the elements of passive coherent signal processing performed by the processor 32. The objective of such passive coherent signal processing is to recover from $A_{tag}(t)$ from s(t), usually by cross correlation s(t)★r(t). This process can be complicated by the presence of undesired scatterers and the direct path interference (DPI) of r(t) itself. Stages of the passive coherent processing according to embodiments of the present application may include remodulation (to recover r(t)), direct path interference (DPI) cancellation (to mitigate the DPI), correlation by mismatched filtering (to recover a signal containing $A_{tag}(t)$), and/or time-frequency analysis (to recover the originally-transmitted data).

The use of coherent processing can, for example, significantly increase the effective range of the detected ambient backscatter signals, for example, potentially enabling signal transmission rates of up to about 1000 bps at ranges exceeding about 100 meters under standard conditions that can be expected at most locations, for example, in view of common digital television transmission signal strengths, and typical terrains and/or typical weather patterns at such locations.

Remodulation and ATSC Digital Television Processing

The remodulation process can isolate a copy of the reference r(t) from the surveillance channel s(t). Remodulation enables compact receivers using non-cooperative transmitters because the receiver does not need to provide angular diversity between surveillance and reference beams as in other approaches. Remodulation may involve implementing a software demodulator following the transmitter's standard as well as modulators that are mismatched to the standard (to improve the results of correlation processing).

In one aspect, broadcast digital television in North America currently generally utilizes 8-VSB (vestigial sideband) modulation based on the ATSC standard. Data at 19.39 Mbps are encumbered with error correction to 32.29 Mbps, and the resulting signal is 8-level amplitude-shift-keyed (ASK) at a symbol rate of 10.76 MHz. An offset with a symbol value 1.25 is added to each symbol, taken from the set [±1, ±3, ±5, ±7], to produce a residual carrier. Nyquist filtering with α+0.1152 is applied to retain the upper sideband of 5.38 MHz, constraining the signal to a total bandwidth equal to the channel size of 6 MHz.

Figure 5:
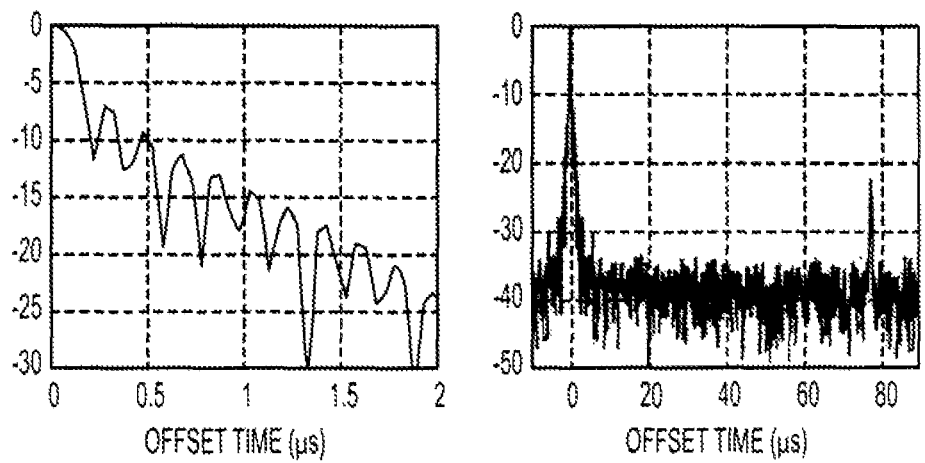
FIG. 5 illustrates a comparison of Zero Doppler correlation properties of a remodulated ATSC signal at different time scales.

In addition to the carrier, timing fiducials may be included in the transmitted signals. These can include a 4-symbol segment sync every 77.3 μs and a full-segment field sync every 24.2 ms. A priori knowledge of the field sync can be used to train the adaptive equalizer required to mitigate multipath. Although useful for demodulation, these fiducials combine with other signal imperfections to impart undesired properties to the autocorrelation of r(t). This autocorrelation (also known as the self-ambiguity function) can affect the fidelity of the final receiver. FIG. 5 illustrates the self-ambiguity of a remodulated ATSC waveform as a function of the time offset. The carrier, which produces correlation energy independent of the time offset, has been omitted from the remodulation process to show other effects. The short time behavior decreases steadily, but not immediately, from the peak as expected for a band-limited signal. The long time behavior exhibits a feature at 77.3 µs corresponding to the segment sync.

Figure 6:
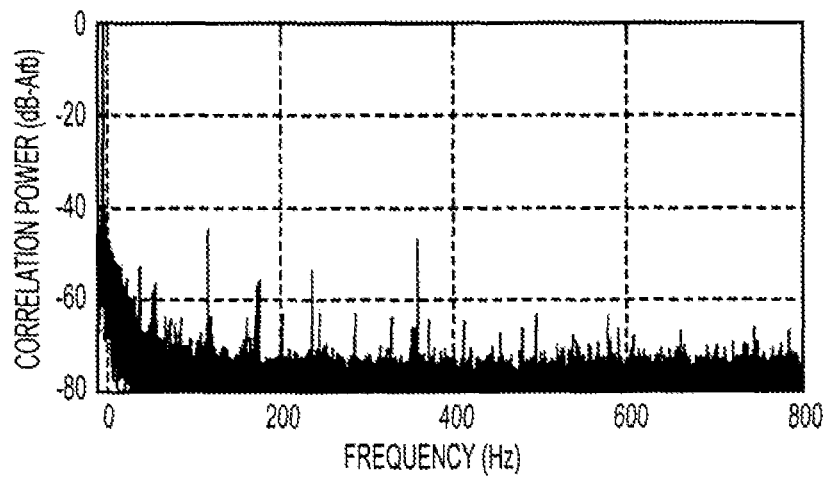
FIG. 6 illustrates Zero-range correlation properties of the remodulated ATSC signal.

FIG. 6 contains a plot of the self-ambiguity as a function of offset frequency for a zero time offset. Artifacts of 60 Hz power line modulation are the dominant features. These are observable up to 480 Hz. Other unidentified artifacts are present, but few features are observed above about 600 Hz. The receiver fidelity can be improved by carefully reproducing these variations in the remodulated signal. For example, the receiver fidelity can be improved by measuring the small variations in the transmitted signal and reproducing (or counterbalancing) them in the remodulated signal. The fidelity is improved by these actions because the correlation process searches for similarities and differences between the two signals. Making the remodulated wave as close to the actual wave as possible reduces processing artifacts.

The remodulation process can generate two output waveforms. First, $\hat{r}(t)$ can provide estimates of the originally-transmitted waveform in all aspects, and can be used for DPI cancellation. Second, r(t) can be generated by applying the technique of mismatched processing to omit components of the waveform generating undesirable correlation properties. For ATSC television, the mismatched waveform generally may omit the carrier and segment syncs, which removes the correlation energy of these signals. The carrier correlates well at all ranges, and, if present, provides a base noise level that can block signal detection therethrough. Omitting it in remodulation may make the receiver more sensitive. The segment sync repeats regularly (about 77 microseconds) and by repeating, creates artifacts, e.g., zero-delay artifacts will appear at 77, 144, etc., microseconds—even though they originated from something at zero offset, because the segment sync carries energy to other ranges. Omitting the segment sync in the remodulation can remove these artifacts.

Direct Path Interference Mitigation

The $L_D r(t)$ term in (1) is known as the direct path interference (DPI), and is noteworthy because it can typically be the dominant term of this expression. In the absence of DPI, the result of the correlation $s(t) \star r(t)$ is usually noise-dominated by $n(t) \star r(t)$, but DPI renders the correlation dominated by $r(t) \star r(t)$, reducing the sensitivity of the receiver.

Various strategies can be taken to mitigate or eliminate DPI. Geographic techniques can be used including placing the receiver in locations where DPI is minimized. Alternatively, antenna-based techniques can use the pattern of the surveillance antenna to place a reduced emphasis in the direction of the DPI. Further, the small size and versatility for the backscatter communications approach according to embodiments of the present invention can utilize signal processing methods. Such methods can attempt to iteratively estimate and remove large contributions of $\hat{r}(t)$ within s(t), and reduce the DPI as well as other stationary clutter. Methods that subtract these contributions in the time domain can include the extensive cancellation algorithm (ECA) and Wiener-Hopf filtering. Image-plane techniques, including CLEAN algorithm, can also be employed.

Figure 4:
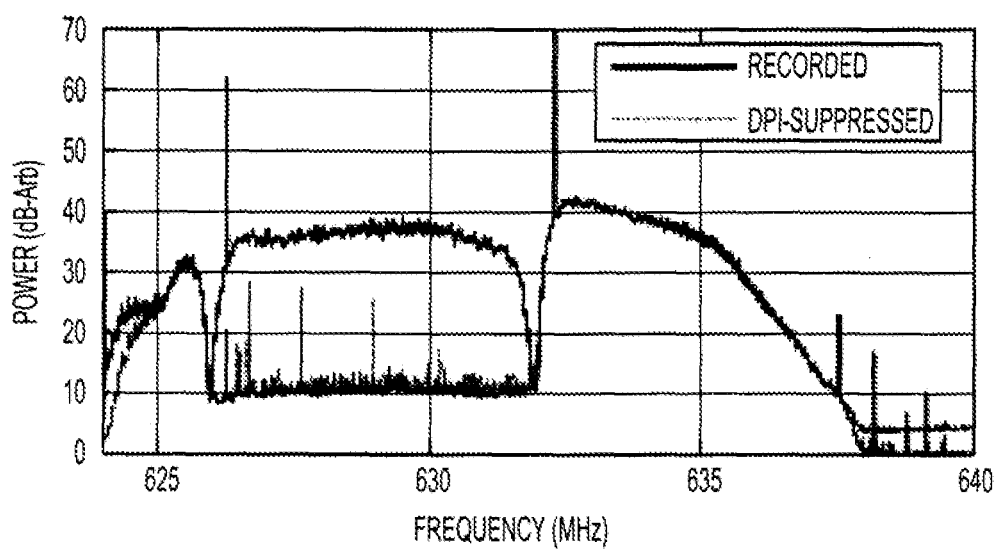
FIG. 4 illustrates raw recorded data and the effect of DPI suppression algorithms across a spectrum of RF channel 40 (broadcast digital television signal spectrum).

According to further embodiments of the invention, DPI cancellation can be achieved using a single-antenna system with remodulation and an ECA-style cancellation algorithm. The spectra shown in FIG. 4 compare the originally-recorded spectrum of channel 40 to the data after the DPI cancellation algorithm is applied.

Correlation Processing and Time-Frequency Analysis

The mismatched remodulated signal $\bar{r}(t)$ can be correlated with the DPI-cancelled surveillance signal s'(t) to produce the cross ambiguity function (CAF) $\chi(T, F)$ as a function of time delay T and frequency offset F. The CAF for a particular offset can be found by the integration over the coherent processing interval (CPI) as $$\chi(T, F) = \int_{CPI} \bar{r}(t-T) \cdot s'(t) e^{-j2\pi Ft} dt. \qquad (2)$$

Ignoring components of s'(t) not contributed by the tag, and writing $A_{tag}$ as a sum of M frequency components, $$\chi(T, F) \approx \int_{CPI} \bar{r}(t-T) \cdot r(t-\tau_B(t)) \sum_{m=1}^{M} A_m e^{-j2\pi t(f_m - F)} dt. \qquad (3)$$

If the self-ambiguity function of $\bar{r}(t)$ lacks significant artifacts, then the CAF tends to zero except where $T=\tau_B$ and $F \in f_M$, which can identify the bistatic delay and modulation component of the tag. If the tag is moving relative to the receiver, the nonzero components F will also exhibit Doppler shift.

Whereas the CAF provides information as to the power spectral density of $A_{tag}$, coherent demodulation of the original data requires full recovery of the complex signal $A_{tag}$. This can be accomplished by rewriting the CAF to include $A_{tag}(t)$ and considering the response across multiple CAFs, where each CAF $\chi_T$ is defined for the CPI at time T. Then $\chi_T$ is given by:

$$\chi_T(T, F) = \int_{CPI} \bar{r}(t-T) \cdot r(t-\tau_B(t)) A_{tag}(t) e^{-j2\pi Ft} dt. \qquad (4)$$

If the CPI is sufficiently short, then $A_{tag}(t)$ is stationary over the integral and factored out, leaving the approximation that $\chi_T(\tau_B, 0) \approx A_{tag}(T)$.

The spectral content of $\chi_T(\tau_B, 0)$ can be examined versus time using time-frequency analysis and rendering the results on a waterfall plot. Moving scatterers appear ephemerally in relation to their speed. Backscattered signals from stationary tags appear at a fixed time offset with the characteristic spectra of $A_{tag}$. Stationary clutter will appear near DC, and suggests that $A_{tag}$ might use subcarriers or other techniques that are immune to the low-frequency clutter.

Figure 7:
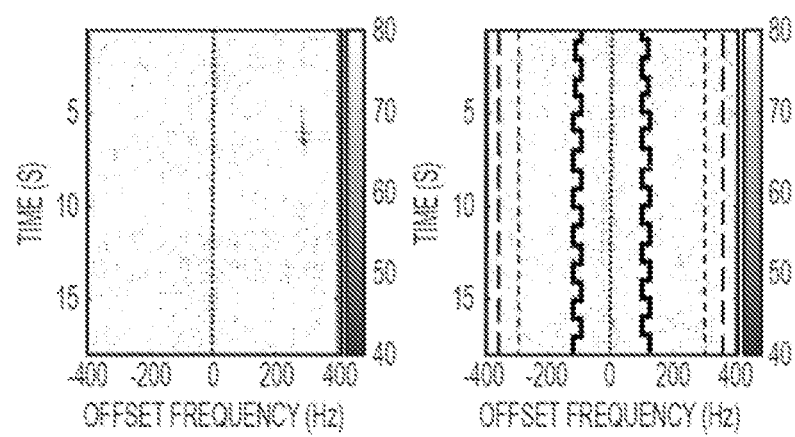
FIG. 7 illustrates time-frequency analyses comparing a radar echo detection of aircraft versus the detection of aircraft using simulated back scatter tag detection.

FIG. 7 contains two time-frequency analyses. The first is of an aircraft detected using the described techniques and a passive radar receiver at Embry-Riddle Aeronautical University (ERAU). The second is a simulation of the expected response from a backscatter tag added to real clutter and interference. In the simulation, the tag antenna is modulated between short-circuited and open-circuited, i.e., $A_{tag}(t) = \text{sgn}\{\cos(\omega_{\{0,1\}} t)\}$, at, for example, a rate alternating between 100 Hz and 120 Hz, representing frequency-shift keying at a low symbol rate.

Predicted Sensitivity and Bit Rate

The achievable range and data rates of this technique are estimated by the detector signal to noise ratio (SNR). Assuming that effective DPI suppression renders the receiver noise-dominated then the SNR is given by as $$SNR = S \frac{t_s \sigma}{k_B T_{RX}} \left( \frac{A_{eff}}{4\pi R_T^2} \right) \eta. \tag{5}$$

The terms in this expression describe the receiver by its equivalent noise temperature $T_{RX}$, processing efficiency $\eta$, and effective antenna area $A_{eff}$. The tag or target can be described by its radar cross section $\sigma$ and line-of-sight distance to the receiver $R_T$. Finally, for a well-constructed receiver the modulation symbol time is equivalent to the integration time $t_s$, and the flux incident on the system by the illuminator can be given by S.

Reasonable values for the terms in equation (5) indicate the expected performance of this technique. For example, a system might exhibit a 75% implementation efficiency and a noise temperature $T_{RX}$=450 K. The effective areas of the tag and receiver are equal with $\sigma=A_{eff}\approx 0.033$ m$^2$ using 600 MHz dipole antennas. The minimum value for illumination flux is about −98 dB (W/m$^2$), based on FCC minimums for coverage areas in a license, as required to provide 15 dB SNR in a customer receiver. At lower values the remodulation algorithm might fail to demodulate the reference signal accurately. However, significantly higher flux values are possible, such as values exceeding −50 dB (W/m$^2$) for a transmitter 68 km.

The range of values can vary from 50 m to 10 km, and might be constrained by the self-ambiguity function on the lower end and line of sight on the upper end. Data rates between 1 bps and 10 kbps can also be considered. Even at the minimum anticipated flux, messages might still be conveyed at 10 bps at 100 m. Higher fluxes might permit rates in excess of 1 kbps at more than a kilometer.

Modifications for Communications

The coherent backscatter communications systems/methods according to embodiments of the present application present several unique aspects as compared to passive radar problems. Some aspects may include: (a) the effect of the bistatic geometry on tag distribution and data capacity; (b) the effect of modulation on moving targets; (c) potential interference on (or from) passive radar operations or targets; and (d) the expected impact of tags on television reception.

Geometric Analysis

The bistatic geometry can affect the minimum operational range for a tag and the density and placement of multiple tags within a scene. The CAF provides the bistatic range, $R_B=c\tau_B$, rather than the true range, to the target of interest. The bistatic range corresponds to the time difference $\tau_B=\tau_I+\tau_R-\tau_D$ between the direct path signal and the signal following the illumination and echo paths. The set of all points sharing the same bistatic range forms an ellipse with the transmitter and receiver at the foci. If the transmitter is much farther from the receiver than the tag, then illumination and direct path rays may be approximated as parallel and the bistatic range $R_B$ is expressed as a function of the true range $R_T$ and relative bearing of the tag from the transmitter $\theta$ (as viewed by the receiver). This relationship is given by $R_B=R_T(1-\cos(\theta))$. A value of $\theta=0°$ can indicate tags in the direction of the transmitter, and $\theta=180°$ indicates directions in the opposite direction of the transmitter.

The autocorrelation function shown in FIG. 5 illustrates that some minimum time offset is required to move the tag response off of the direct path response (which is still measurable after DPI cancellation). The angle dependence of $R_B$ can enhance or reduce the true range for this minimum bistatic range. For example, if the ambiguity function requires $R_B \geq 100$ m to resolve the tag, true minimum ranges may vary from $R_T$=50 m at $\theta$=180° to $R_T$=3000 m at $\theta$=15°. As with passive radars, a passive backscatter system according to embodiments of the present application may exploit the spatial diversity offered by multiple illuminators to eliminate blind zones.

The bistatic geometry also complicates the problem of multiplexing tags within a scene. Tags may be multiplexed in both space and time by exploiting different bistatic ranges and modulation schemes $A_{tag}(t)$. A full analysis of data capacity may depend on the application, but will inherit the dependence on $(1-\cos(\theta))^{-1}$.

Required Modifications to Range Walk Compensation

For stationary tags, a processor may identify and perform processing at a fixed $\tau_B$. However, moving tags typically migrate through values of $\tau_B$ over time and typically must be tracked. This phenomenon is known as range walk and will be most challenging when $vt_s > cB^{-1}$, i.e., when a target migrates by a range cell within a single symbol time, and might be observed for fast velocities and slow data rates. Range walk is observed in the aircraft echo in FIG. 7 and is also a challenge faced by passive radars. Techniques to mitigate range walk may include hypothesis-based stretch processing and non-hypothesis-based reformatting.

The keystone formatting technique can reduce range walk and significantly improve integration time. This technique reformats the CAF, which is represented in the fast-frequency slow-time domain as a function of the radio frequency $f_c$ and time t as $\chi(f_c, t)$. This is related to the fast-time slow-frequency CAF by the two-dimensional Fourier transform as $\chi(T, F) \Leftrightarrow \chi(f_c, t)$. The keystone formatting algorithm is explained by observing that Doppler shift is proportional to the exact radio frequency $f_c$ and that it varies across the spectrum of the illuminator. Furthermore, accumulations in the difference of the CAF phase among the fast frequency channels as a function of this differential Doppler shift give rise to the range walk phenomenon.

The normalized CAF for a moving radar target can be expressed as a function of the target's velocity v and initial bistatic delay $\tau_0$ as $$\chi(f_c, t) = \exp(j2\pi f_c [\tau_0 + vc^{-1}]). \tag{6}$$

The keystone algorithm reformats the CAF in this domain to create a new CAF given by $$y(f_c, t) = \chi(f_c, T(f_c)), \tag{7}$$

where the interpolation function is $T(f_c) = tf_0 f_c^{-1}$ and $f_0$ is arbitrarily selected (often at the lower bound of the channel to ensure causality). This yields a new CAF in which the accumulation of phase with time is frequency-independent, eliminating range walk, as $$y(f_c, t) = \exp(j2\pi [f_c \tau_0 + f_0 vc^{-1} t]) \tag{8}$$

One challenge in applying this technique to backscatter tags is that whereas typical radar targets exhibit frequencies proportional to their velocity, the frequency spectrum of a tag is dependent both on velocity and the modulation. The CAF for a moving tag is expressed as $$\chi(f_c, t) = \sum_{m=1}^{M} A_m \exp(j2\pi[f_c\tau_0 + t\{f_c v c^{-1} + f_m\}]). \quad (9)$$

In this case, keystone formatting no longer solves the range walk, but the exponential retains a term that varies with both time and frequency in $\exp(j2\pi[f_c\tau_0 + t\{f_0 v c^{-1} + f_m f_0 f_c^{-1}\}])$.

Mutual Interference of Radar and Backscatter

FIG. 7 reveals a potential conflict between radar targets and backscatter targets in a receiver. Strong radar targets presented on the same bistatic range contour as the tag and at a Doppler shift within the bandwidth of $A_{tag}$ might cause symbol errors in decoding $A_{tag}$. Conversely, the tag might present false targets to a passive radar designed to detect aircraft. Solutions to these problems may include restricting subcarriers of $A_{tag}$ to lie outside the range of possible target velocities, or applying non-sinusoidal basis functions to the modulation of $A_{tag}$ (e.g., CDMA) to render the modulation below the noise floor of a passive radar. Such a technique may further render the tag "stealthy" with respect to current passive detection techniques, and might increase the usefulness in covert applications.

Figure 8A:
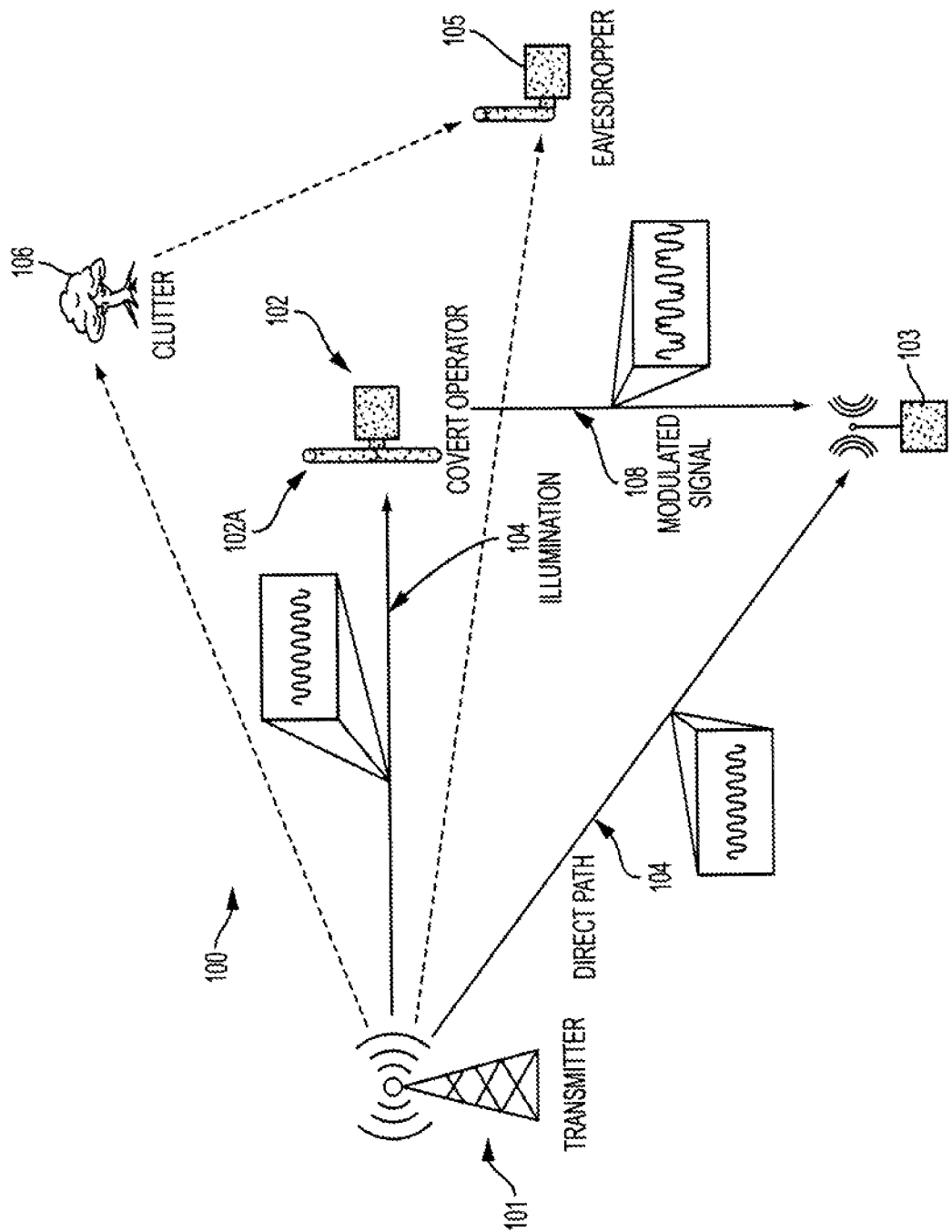
FIG. 8A is a schematic view of a covert communication system according to another embodiment of the present invention.

Utilizing a transmitter 1 or an array of transmitters, targets/ tags 2, and receiver configurations 3 to perform the processing operations as shown in FIG. 1, for example, and as described above, the communications systems 10 can be configured for various applications according to embodiments of the present application as illustrated in FIGS. 8A-10. For example, as indicated in FIGS. 8A-8C, in one embodiment, a communications system 100 for covert operations can be realized. In this system 100, the transmitter 101 (which can be a dedicated transmitter or a transmitter of opportunity) generates signals 104 that are incident on a tag, which acts as a covert operator 102, and are received by a receiver 103. The covert operator 102 may not have a transmitter, and instead may only include an antenna 102A, and changes to the physical properties of the antenna 102A (like opening or closing its terminals) may change how transmitter waves 104 incident on the covert operator 102 are reflected. For example, a user of the covert operator 102 can manipulate the antenna 102A according to a specific code or pattern, e.g., Morse code or other code arrangement, to relay a communication, such as a covert communication, to the receiver 103. Alternatively, the covert operator 102 may include a controller 111 configured to control the load termination device 110 to alter the transmitter waves 104 incident on the covert operator 102 based on a specific confidential or secret code known only to the covert operator 102 and the receiver 103, similar to code division multiple access (CDMA).

Figure 8B:
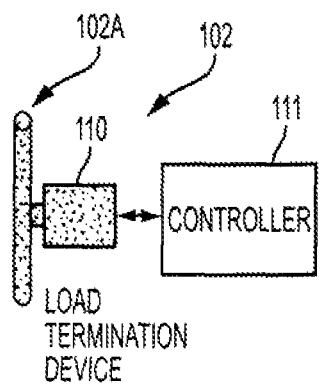
FIG. 8B is a schematic illustration of a tag or target device for use in the communication system of FIG. 8A.

As illustrated in FIG. 8B, according to embodiments of the present application, the covert operator 102 further may be implemented as a device including an active or passive tag, as detailed above, with an antenna 102A, a load termination device 110, and a controller 111, which controls the load termination device 110 to modulate a signal incident on the covert operator 102 according to a particular modulation pattern, which may be based on a confidential or secret code for a transmission. The covert operator 102 also can include a user interface (not shown), such as a display, e.g., a touch screen display, with inputs allowing for a user to input a particular communication for sending to the receiver 103 and/or the confidential or secret code in which to base modulation of the incident signal from the transmitter 101. Additionally, the covert device 102 can be used as a part of a larger communication system, integrated device, or existing device or system, e.g., a smart phone, walkie-talkie, or other suitable device. For example, the user interface of a personal electronic device, e.g., a smart phone, can be used to input communications and/or confidential secret codes for communicated transmissions.

Figure 8C:
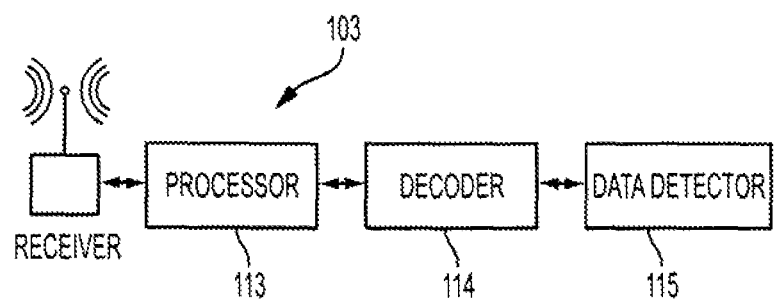
FIG. 8C is a schematic illustration of a receiver for use in the communication system of FIG. 8A.

The receiver 103 can receive a signal or series of signals 104 directly from transmitter 101, and a reflected and/or modulated signal 108 from the covert operator (tag) 102. Additionally, with this embodiment, the receiver can include or be in communication with a processor 113, a decoder module 114, and a data detector 115 (FIG. 8C). The processor 113 can use processing techniques to identify and segregate components of the modulated signal 108 from the covert operator 102 (such as by separating noise or clutter therefrom). The processor 113 can perform additional processing on these components of the modulated signal to generate, detect, and/or otherwise identify characteristics of the covert operator 102, which may include, for example, a "range" and/or "velocity" of the covert operator 102, since the reflected and/or modulated signal 108 can include signals representing a time and/or frequency shifted copy of the transmitted signal prior to modulation by the covert operator 102. However, such characteristics of the modulated signal are not so limited and may further include any characteristics or properties of the covert operator, such as altitude, depth, acceleration, signal integrity, and/or any other desirable characteristics and/or properties of the covert operator 102 as well as coded messages and/or other communications from the covert operator 102. The decoder module 114 can be used to identify or determine the content of coded messages and/or communications transmitted or otherwise sent from the covert operator 102 based on the modulated signal and a confidential or secret code known, for example, only to the covert operator 102 and the receiver 103.

The covert communications can thus be configured such that even if a potential eavesdropper 105 receives signals from the covert operator 102, transmitter 101, and also from other clutter 106, e.g., trees and/or airplanes, without possessing the specific code known, for example, only to the covert operator 102 and the receiver 103, the signal from the covert operator 102 is essentially indistinguishable from signals generated from clutter 106. Thus, an eavesdropper 105 could be deterred or substantially unable to detect the communications data or even determine the covert operator's 102 presence.

According to additional embodiments of the present invention, the covert operator 102 also can apply a modulation code to the reflection (similar to RFID), and the receiver 103 can scan or look for this modulation code. Modulation codes can further introduce new effects of permitting the reflection to carry data, and permitting the reflection to be obfuscated and undetectable by eavesdroppers without the code. For example, the covert operator 102 can apply a simple on/off code to the reflection. The speed of on/off may convey information about the data (e.g., Zero or 1), using the scheme known as frequency shift keying (FSK). Thus, even if the eavesdropper 105 were aware of a covert operator's 102 presence, the eavesdropper 105 would have to perform extensive searching for the reflections or modulated signal 108 of the covert operator 102 and would only be able to observe the covert operator 102 as a radar target at a fixed range with alternating velocity, without knowing the specific information which the covert operator 102 is conveying.

Application of a more complicated code by the covert operator 102 is also possible and could make the covert operator 102 transmissions more like CDMA coded transmissions. With this code, even if an eavesdropper 105 suspected that a covert operator 102 is present, the covert operator's signals or reflections still may not be detected/determined or even observed with the specific code, which would only be known to the covert operator 102 and receiver 103, and even if the eavesdropper 105 attempted to move within closer proximity to the covert operator 102 (e.g., one typical method is to burn-through CDMA noise floor to try to get close) then the additional clutter 106 would overwhelm the eavesdropper's receiver, preventing the eavesdropper from observing the covert operator.

In addition, the transmission message being sent by the covert operator 102 using embodiments of the present application would not require a radio or other transmitter in the conventional sense, but rather can allow for the low-speed ability of the covert operator 102 to manipulate the antenna 102A. Embodiments of the present application thus allow the covert operator 102 to send messages at radio or other frequencies without a conventional radio or other conventional transmitter, the covert operator 102 needing only the ability to manipulate the antenna 102A (which generally is much less complicated). This reduces the cost of the covert operator 102, since nearby TV station transmitters 101 (e.g., transmitters of opportunity) can be used as a transmitter source such that a dedicated transmitter is not required, and may enable low-cost sensors to be deployed for a long time with a small battery. The message sent by the cover operator 102 according to embodiments of the present application is also less likely to be intercepted, even with advanced detection techniques, such as "RF sniffers," in comparison with conventional methods of "hiding" transmissions (low probability of intercept, LPI) that bury signals below the noise using a spread spectrum. However, if an eavesdropper 105 is sensitive, these can still be found (e.g., when the eavesdropper is close to the covert operator).

In the proposed system according to embodiments of the present invention, the communicated information can be buried within the expected local reflections that clutter 106 (e.g., trees, airplanes, etc.) generates, making it difficult for an eavesdropper 105 to identify the covert operator's 102 presence without knowing the confidential or secret code for the communicated transmission. One way for an eavesdropper 105 to "sniff out" a covert operator 105 could include implementing its own passive radar detector in close proximity to the covert operator 102. However, since there are many possible choices for transmission, the eavesdropper would essentially have to "luck out" and pick the right signal, or try all signals, which generally would make a successful eavesdropper 105 operation very expensive compared to the receiver 103 and covert operator 102 operation.

Though the above example describes one exemplary explanation of a covert communication system 100, embodiments of the present application are not limited thereto and may include a more traditional communication system. For example, using the above techniques involving the transmitter of opportunity 1, passive and active tags 20/20', and receiver 3, a communication system between the tags 20/20' and receiver 3 can be realized, wherein data links can be established between the tags and receiver that can be robust to loss of the regular infrastructure (e.g., loss or limited availability of transmission channels) and/or robust to intentional interference (e.g., allow for secure communications between a device incorporating the tags and receiver according to embodiments of the present application).

Figure 9:
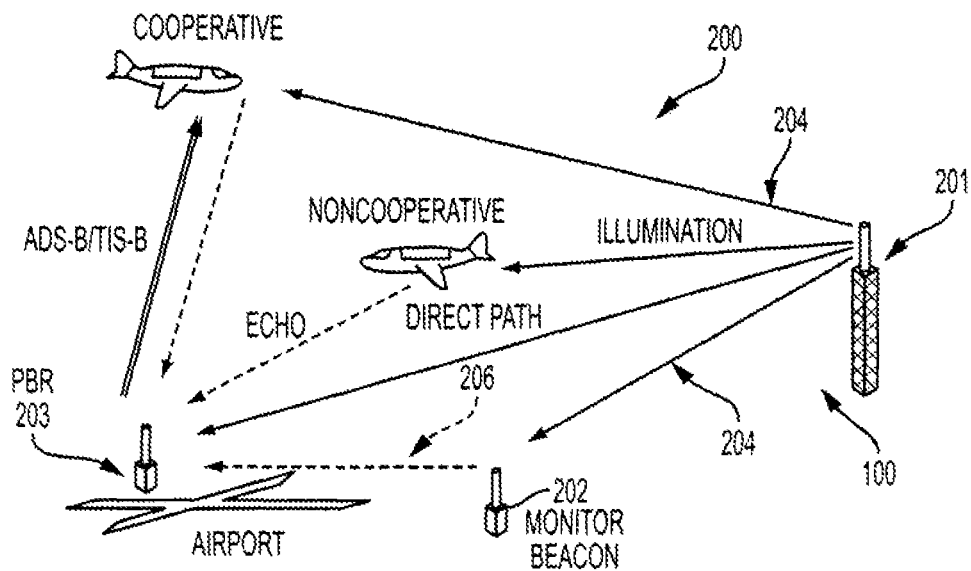
FIG. 9 is a schematic illustration of a communication system for signal monitoring according to an alternative embodiment of the present invention.

Alternative embodiments of the present application further may be used for applications such as signal quality monitoring. For example, as shown in FIG. 9, a communications system 200 according to embodiments of the present application can be used to monitor signal quality of an existing radar system and/or other monitoring systems. With this embodiment, the communications system 200 may utilize a transmitter or transmitters of opportunity 201, which can include, for example, TV station transmitters, transmitting ambient signals 204. The communications system 200 can further include a tag or tags, detailed above, which can operate as one or more monitor beacons 202. Through scattering, reflecting, retransmitting, and/or otherwise altering the transmitter waves or signals 204 incident on the monitor beacon(s) 202, the monitor beacon(s) 202 can project a signal of known modulation 206 into the scene by way of backscatter using the passive and active modulation techniques of the passive and active tags described above.

For example, modulation techniques can be used to induce a frequency shift in the reflection to separate a monitor beacon signal or echo 206 from clutter or other noise received. Such monitor beacon signals 206, e.g., an echo, that can be generated or reflected by the one or more monitor beacons 202 can be received by a passive radar system 203 including a receiver, and a processor configured to perform the above described signal processing to detect and more particularly identify the signal from the one or more monitor beacons 202. Accordingly, the presence, absence, or other qualities of this signal from the monitor beacon 202 as received by a passive radar 203 allow inferences, automated or otherwise, indicative of the performance characteristics of the radar (e.g., for self-monitoring), which can reveal faults in the radar not readily observable with other techniques. For example, the absence of observing aircraft in radar outputs might indicate either that no aircraft are present or that the radar has failed, while the lack of observing the beacon would indicate a complete failure of the radar system (or the monitoring beacon 202). Such regular signal integrity monitoring may be used to improve the safety and reliability of systems utilizing this technique for surveillance in various domains of air, land, sea and/or other applications. In addition, the uniquely identifiable signal provided by the monitor beacon 202 may provide information on the radar sensitivity, thereby improving confidence in the radar system.

Figure 10:
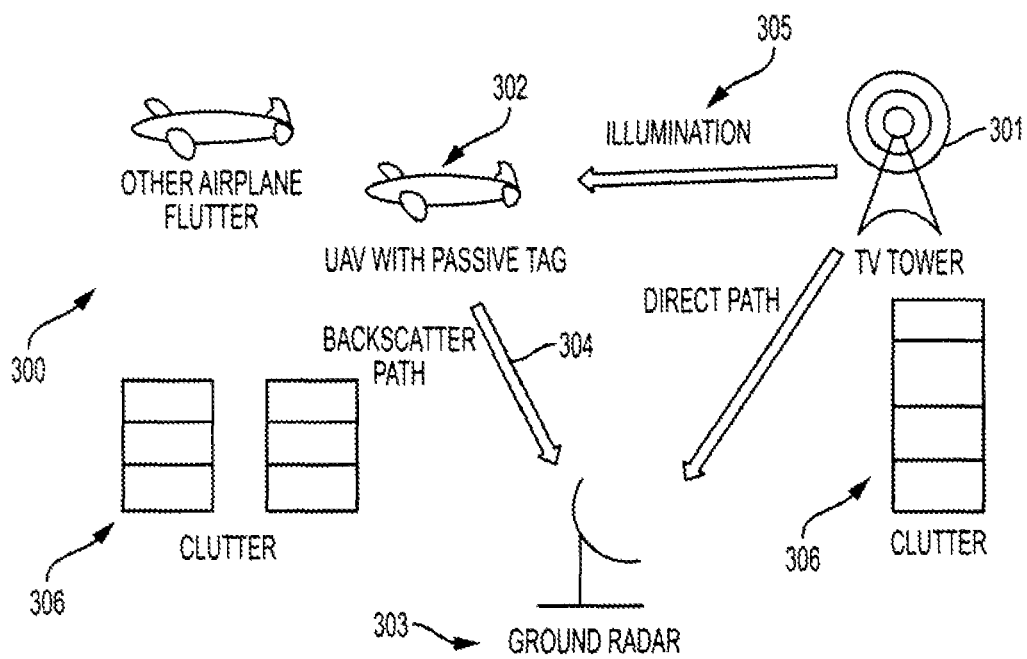
FIG. 10 is a schematic illustration of a communication system for detection of and communication with vehicles according to a further embodiment of the present invention.
Figure 11:
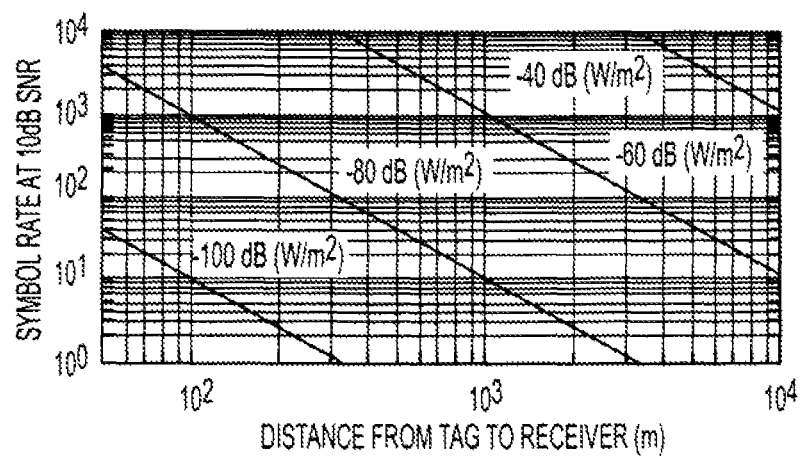
FIG. 11 illustrates comparisons of noise limited data rate versus distance for hypothetical back scatter tags at different illumination strengths.
Figure 12:
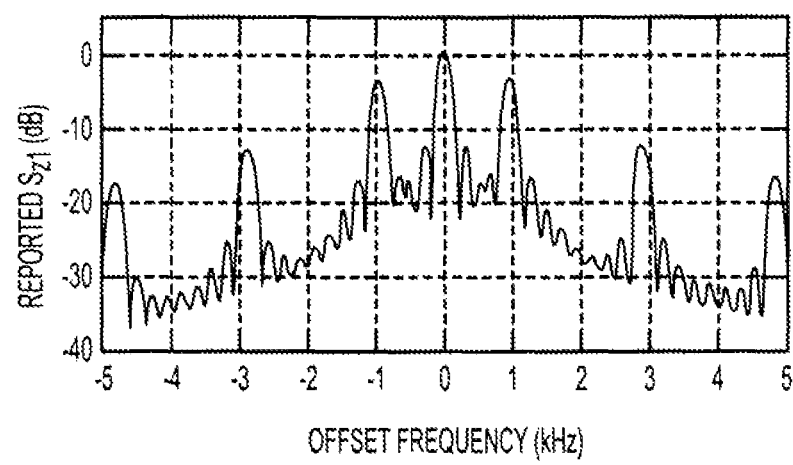
FIG. 12 is a graphical illustration of measured power versus offset frequency for a modulation.

According to still a further embodiment of the present application, a communications system 300 can be implemented for communication with and/or detection of a vehicle 302, such as a land vehicle, maritime vessel, aircraft, and/or spacecraft (FIG. 10). For example, a tag or series of tags 20/20' according to embodiments of the present application can be included in a sensor device or system disposed on or placed in vehicle 302. The tag or series of tags 20/20' also can be integrated with the existing transmission system of the vehicle 302. These tags 20/20' can modulate a signal 305 received or reflected from a transmitter of opportunity 301, such as a TV transmitter, which is incident to the vehicle 302. An available ground radar system 303, which may include or be in communication with a receiver and processor according to embodiments of the present invention, can receive this modulated signal 304 and implement the above discussed passive/active signal processing to communicate with or otherwise detect characteristics of the vehicle. As noted above, such signal processing can include separating or identifying the modulated signal 304 from other clutter or noise received allowing an observer using the receiver to obtain information regarding vehicle's environment, e.g., the characteristics of the illuminating signal and/or the physical orientation, position, or velocity of the vehicle. For example, the receiver can directly measure the speed and location of the vehicle through physical measurement of the properties of the backscattered signal (e.g., using principles of time delay and Doppler shift) and/or receive other characteristics, such as communications, aircraft identification, or other messages, by means of data encoded onto the backscatter. Further, such communications can be transmitted and received as part of a covert communications system 100 as discussed above.

The vehicle 302 can include, for example, an unmanned aerial vehicle. Using the communications system 300 according to embodiments of the present application with an unmanned aerial vehicle may allow for communications systems that do not over burden the power source of the unmanned aerial vehicle 302, which can provide a benefit over traditional radar power demands for small unmanned aerial vehicles. Additionally, the tags 20/20' can allow for communications with and/or detection of unmanned aerial vehicles even in light of the numerous constraints and restrictions of such vehicles, e.g., regulatory, legal, size, international, or mission/covertness. This system and method can also allow for monitoring of unmanned aerial vehicles without taking away resources from existing radar channels, which may be beneficial as the utilization of unmanned aerial vehicles increases.

A further embodiment of the present application includes the use of active or passive tag(s) 20/20' as a locator beacon to represent the characteristics of localization and identification with low power requirements. A locator beacon, for example, may be implemented as a stand-alone device or an extension to another device, e.g., a personal electronic device. For example, the tag 20/20' can incorporate a sensor or sensors provided in, or disposed on, a personal or stand-alone electronic device, and may modulate a signal from a transmitter of opportunity 1 incident on the electronic device. The receiver 3, which can also be incorporated with or otherwise in communication with another electronic device, can receive the modulated signal from the tag 20/20' incorporated with the electronic device and perform the above processing to receive communications from the electronic device. For example, implementations of sensors including tags 20/20' according to embodiments of the present application with an electronic device (e.g., a smart phone) may enable precisely locating and identifying the electronic device in emergencies and/or other circumstances even when the electronic device is powered off or has a dead battery, which could eliminate an inherent challenge of the limited lifetime of emergency location devices in present use.

Other alternative embodiments also are possible with multiple variations on modulation schemes further being possible.

System Testing

Experimental work on the coherent passive backscatter approach includes both laboratory and in-situ measurements. A simple reflective tag architecture was adopted for these experiments, which is assembled from connectorized components for versatility. The tag includes an antenna, minicircuits microwave switch (model ZMSW-1211), and an Arduino Uno microcontroller. The switch is configured so that the common port is attached to the antenna and ports 1 and 2 are connected to an open and short circuit load, respectively. The Arduino creates complimentary square waves necessary to drive the switch at a programmable rate, alternating the common port between connections to ports 1 and 2, implementing $A_{tag}=1$ when connected to the open circuit load and $A_{tag}=-1$ when connected to the short circuit load. Implementation losses in the switch, cable, and connectors are estimated at less than 3 dB.

Laboratory Testing

Laboratory measurements were conducted and verified the use of above described tag architecture. These measurements use an Agilent E5071B vector network analyzer (VNA) as a proxy for both the transmitter and the radar receiver. This analyzer's frequency-offset option permits analysis of scattering parameters when the received frequency $f_2$ is not the same as the transmitted frequency $f_1$. These measurements select the relationship that $f_2=f_1+\Delta f$, such that changing $\Delta f$ permits the observation of modulation sidebands.

The first example experiment verified the frequency offset mode of the VNA and the functionality of the switch. The system was configured so that the common port of the switch was connected to the VNA port 1 and port 2 of the switch was connected to the VNA port 2. The remaining port of the switch was terminated in 50Ω. The Arduino modulated the switch with a 965 Hz square wave. The VNA measured S21 at a variable frequency offset $\Delta f$ between ±5 kHz in 20 Hz steps. Additional settings included an IF bandwidth of 200 Hz, RF range of 11 discrete frequencies from 100 MHz to 1 GHz, and 32-sweep averaging. Results illustrating $S_{21}(\Delta f)$ are shown in FIG. 10, where each datum includes averaging across the multiple sweeps and RF band. The observed fundamental and odd harmonics of the Arduino's switching rate are consistent with the expectations of the configuration.

A second example experiment was designed to resemble the bistatic backscatter and used three 500 MHz monopole antennas as the transmitter, receiver, and tag. The transmitter and receiver were connected to ports 1 and 2 of the VNA. The tag's monopole was connected to the RF switch, which was terminated in an open on port 1 and a short on port 2 and was modulated by the Arduino. The radiators are each spaced approximately 45 cm apart. The IF bandwidth of the VNA was reduced from 200 Hz to 10 Hz to improve sensitivity, and the list of offset frequencies $\Delta f$ was reduced to just 0 Hz (the direct signal), 965 Hz (the modulation), and 500 Hz (a reference at which no signal is expected).

Two cases evaluated were, first, with the switch disconnected from its load line (leaving the line open circuited), and, second, with the switch connected and modulating the load line. In each case, the measurements are evaluated similarly to the first experiment, but modified to consider only frequencies close to the 500 MHz resonance of the of the antennas.

Data from this experiment are summarized in Table I below and show the indicated $S_{21}(LV)$ in both the "disabled" (modulation off) and "enabled" (modulation on) states, as well as the difference between the states. It is observed that the 965 Hz measurement increases by 25.8 dB when the modulation is enabled, while power at the other frequencies is only slightly changed. Furthermore, the difference between the strength of the direct path and modulation (23.9 dB) is similar to the far-field value of $\sigma/(4^2\pi^2R^4) \approx 18.3$ dB, and the differences are explainable by implementation loss.

TABLE I

| BACKSCATTER LOSS POWER MEASUREMENTS | | | |
|---|---|---|---|
| | Modulation State | | |
| Offset Frequency | Disabled | Enabled | Difference |
| Direct Signal (0 Hz) | −20.5 dB | −20.2 dB | 0.3 dB |
| Modulation (965 Hz) | −69.9 dB | −44.1 dB | 25.8 dB |
| Reference (500 Hz) | −82.2 dB | −80.9 dB | 1.3 dB |

Field Tests

Field tests were designed to demonstrate the viability of the tag concept in a real-world environment. The outdoor measurements were conducted at ERAU's Daytona Beach campus. The tag antenna was a mobile broadband discone elevated approximately 2 m above the ground and the receiver was an existing discone located on the roof of the Lehman Engineering Building. The output of the receiver is delivered to a data recorder which is configured to sample at a rate of 20 MS/s and the heterodyne is software-tuned to cycle through recording RF channels 39, 40, and 41. Each recording was 20 s in duration and post processed according to the algorithms as discussed above.

While channels 39 and 41 were recorded for analysis, the illuminator WACX on channel 40 was selected as the primary illuminator for this experiment because of previous successes with the passive radar signal chain. This station is located about 68 km to the southwest of the receiver at ERAU. FCC databases indicate that the station has a 1 MW effective radiated power and a height of 493 meters above the average terrain. Expected signal strengths at ERAU vary based on the prediction technique, with −53 dB (W/m$^2$) predicted by the FCC's online tool and values between −55 dB (W/m$^2$) (90% of the time) and −48 dB (W/m$^2$) (50% of the time) given by the passive radar simulator for heights 10 meters above the ground. Signals decrease in strength closer to the surface, and the simulator provides predicted fluxes between −60 dB (W/m$^2$) to −70 dB (W/m$^2$) at the 2 m height of the tag. Although the vertically-polarized tag and receiver are cross polarized to the transmitted television signal, it is noted that the recorded direct path SNR is still in excess of 25 dB and aircraft are observed in the radar mode. However, this cross polarization does reduce the effective illumination of the tag.

Figure 13A:
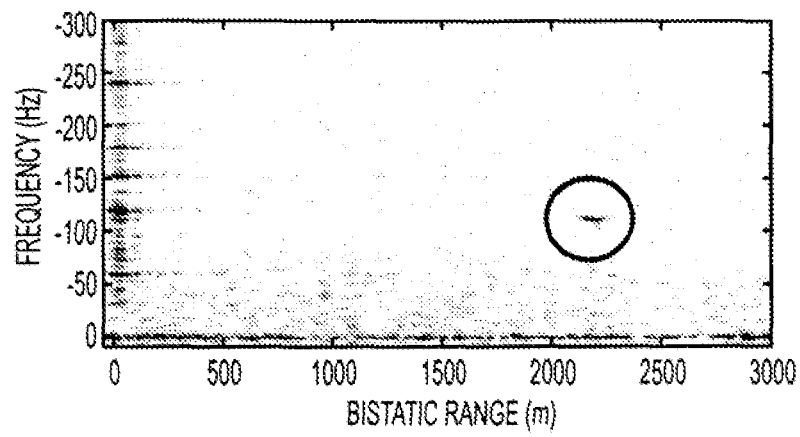
FIGS. 13A-13B are graphical illustrations of Range-Doppler CAF from backscatter measurements demonstrating an aircraft detection using communication systems as detailed herein.
Figure 13B:
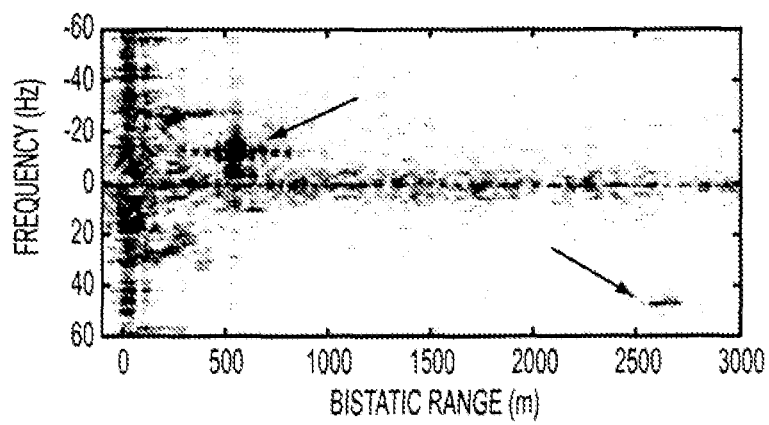

Two series of measurements were conducted in which the tag was moved to various locations around the ERAU campus. The first data set included tag locations to the south and southeast of the receiver and the tag was configured to alternate between 260 Hz and 297 Hz modulation at 5 second intervals. The second set of measurements changed the tag modulation to 855 Hz (to further separate it from the artifacts illustrated in FIG. 5) and focused on locations to the west and east of the receiver for bistatic ranges separating the tag from the DPI. Each measurement set generated several hundred gigabytes of recorded data. The data are processed according to the methods discussed in detail above, producing range-Doppler CAFs. The modulated tag is expected to be visible as a point within this surface at a range corresponding to the bistatic range and a frequency corresponding to the modulation. Several conclusions can be assessed regarding these measurements. First, aircraft are readily observed in many of the recordings, verifying that the signal processing architecture is working as expected. A CAF illustrating an aircraft at 2200 m and 120 Hz is shown in FIG. 13A, and a CAF showing two aircraft identified near a 500 m and a 2600 m ballistic range is shown in FIG. 13B. Second, the influence of clutter, residual DPI, and power line modulation are each also visible in FIGS. 13A-B. Power line artifacts are observed because the initial processing has not yet phase matched the r̄(t) to cancel these effects.

Figure 14A:
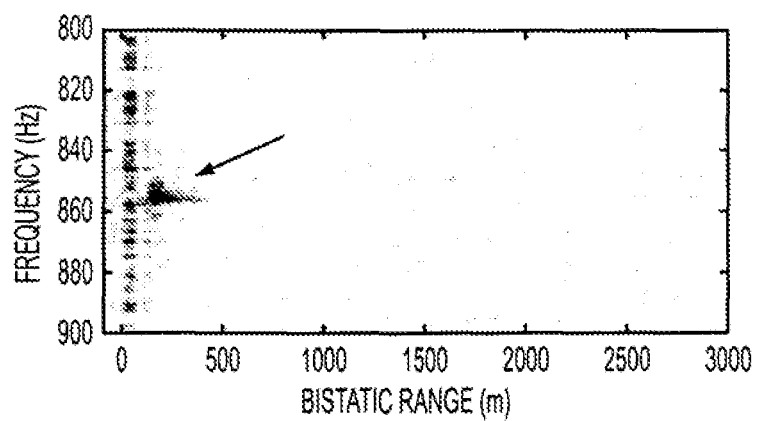
FIGS. 14A-14B are graphical illustrations of Range-Doppler CAF tag detection using communication systems as detailed herein.
Figure 14B:
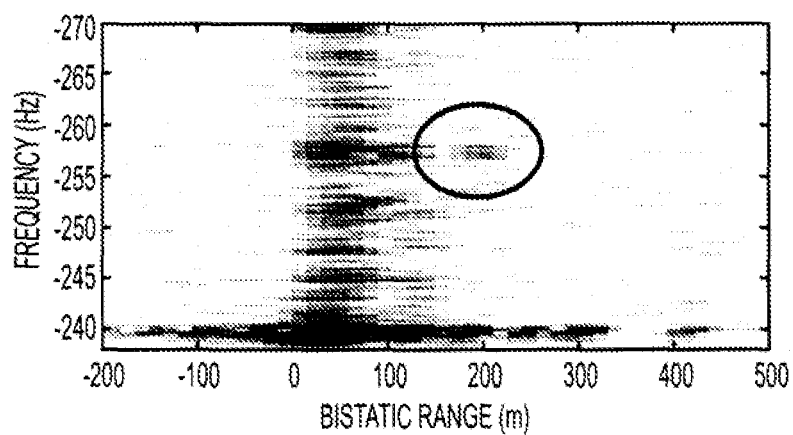

A backscatter detection is shown in FIG. 14A at 150 m and 855 Hz. The 855 Hz modulation appears at a range consistent with the combination of the bistatic delay and the delay line used in the experiment. An additional backscatter signature detection candidate is illustrated in FIG. 14B at 200 m and 257 Hz, which are similar to expectations for the tag's location at that time. It is noted that although FIG. 7 predicts detections even at very low incident flux, and the measured cross-polarization SNR implies a predicted cross-polarized tag flux of at least −100 dB (W/m2), lower flux reduces the margin significantly and an ultimate lack of detection would indicate higher than anticipated losses in the implementation.

Additionally, though the polarization loss can be recovered by using correctly-polarized antennas, vertical polarization was selected because the receiver antenna was pre-existing and inconvenient to change. However, a slant or circular polarization can be used for the tag to exhibit a partial match to both the illumination and the receiver.

The proposed method of using correlation processing for ambient backscatter communications according to embodiments of the present application can increase achievable ranges and data rates far beyond those reported for incoherent processing. Theoretical SNR analyses suggest data rates exceeding 1 kbps at shorter ranges, and useful rates at ranges exceeding a kilometer. Although this benefit comes at a cost of increased receiver complexity, the tags themselves remain simple. Analyses of the CAF have further shown that coherent processing allows additional multiplexing of multiple tags in bistatic delay $\tau_B$ as well as in the signal schemes of $A_{tag}$.

The DPI and clutter may present a detection challenge and the tag signal must be separated from the DPI in time and the clutter in frequency. These constraints imply a minimum operational distance as well as the use of subcarriers to avoid components of $A_{tag}$ at frequencies near the clutter or moving targets. Additionally, it was found that current methods of mitigating range walk to improve sensitivity might not be applicable to moving tags since the modulation decouples velocity and frequency. Finally, the illumination flux will exhibit significant spatial and temporal variations, requiring appropriate planning and margins.

Although one benefit of this technique might be in opening up shared spectrum for secondary communications, other possible applications to signal obfuscation are intriguing. Without the use of coherent processing, the backscatter is indistinguishable from clutter, and as noted above spread spectrum modulation of $A_{tag}$ can reduce the likelihood of detection by traditional processing. Furthermore, minimum ranges imposed by DPI might mask detection by short-range receivers attempting to raise the PSD of $A_{tag}$ above the noise.

The foregoing description generally illustrates and describes various embodiments of the present invention. It will, however, be understood by those skilled in the art that various changes and modifications can be made to the above-discussed construction of the present invention without departing from the spirit and scope of the invention as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present invention. Accordingly, various features and characteristics of the present invention as discussed herein may be selectively interchanged and applied to other illustrated and non-illustrated embodiments of the invention, and numerous variations, modifications, and additions further can be made thereto without departing from the spirit and scope of the present invention as set forth in the appended claims.

We claim:

1. A communications system for enabling covert communication, comprising:

a covert operator configured to modulate at least one transmission signal of a series of transmission signals emitted from a transmitter of opportunity according to a prescribed code so as to generate a covert transmission signal; and a receiver configured to receive a composite signal, including a direct transmission signal from the transmitter of opportunity and one or more components of the covert transmission signal from the covert operator, the receiver comprising a processor configured to perform coherent processing on the composite signal so as to identify the one or more components of the covert transmission signal based on the prescribed code enabling covert communication between the covert operator and the receiver.

2. The communications system of claim 1, wherein the transmitter of opportunity comprises a digital television transmitter.

3. The communications system of claim 1, wherein the covert operator comprises:
a passive tag device including an antenna;
a load termination device connected to the antenna; and
a tag device controller that modulates the load termination device, the tag device controller being configured to vary modulation of the load termination device with time so as to modulate the at least one transmission signal of the series of transmission signals and generate the covert transmission signal.

4. The communications system of claim 1, wherein the covert operator comprises:
an active tag device including an antenna configured to receive the at least one transmission signal of the series of transmission signals;
a load termination device connected to the antenna;
a tag device controller that modulates the load termination device, the tag device controller being configured to vary modulation of the load termination device with time so as to modulate the at least one transmission signal of the series of transmission signals and generate at least one modulated transmission signal; and
a signal modifying device configured to modify the at least one modulated transmission signal, wherein the tag device controller and signal modifying device generate the convert transmission signal and the antenna transmits the covert transmission signal.

5. The communications system of claim 4, further comprising:
a plurality of antennas in communication with the active target device, the plurality of antennas including a first antenna configured to receive the at least one transmission signal of the series of transmission signals and a second antenna configured to transmit the covert transmission signal.

6. The communications system of claim 1, wherein the coherent processing performed by the processor comprises remodulation processing of the composite signal to generate a representation of the direct transmission signal from the transmitter; and applying a cancellation algorithm using the representation of the direct transmission signal from the transmitter to reduce a direct path interference of the composite signal and generate a reduced direct path interference signal.

7. The communications system of claim 6, wherein the remodulation processing of the composite signal further comprises generating a mismatched remodulated signal via mismatched processing, and the coherent processing further includes correlating the mismatched remodulated signal with the reduced direct path interference signal to generate a cross ambiguity function as a function of a time delay and a frequency offset.

8. The communications system of claim 1, wherein the covert operator is connected to a vehicle.

9. The communications system of claim 1, wherein the prescribed code is selected such that the covert transmission signal is substantially indistinguishable from clutter so as to prevent a potential eaves-dropper from detecting the covert operator's presence and/or detecting the covert transmission signal.

10. A method of establishing covert communications with a covert operator, comprising:
generating a covert transmission signal by the covert operator, the covert transmission signal being generated by modulating one or more of a series of transmission signals emitted by a transmitter of opportunity according a predetermined code;
receiving a composite signal via a receiver, the composite signal including a direct transmission signal emitted from the transmitter of opportunity and the covert transmission signal generated by the covert operator, the at least one modulated transmission signal being generated by modulating at least one transmission signal of the series of transmission signals; and
identifying components of the at least one modulated covert transmission signal using coherent processing based at least in part on the predetermined code so as to enable covert communications between the covert operator and the receiver.

11. The method of claim 10, wherein the covert transmission signal is generated by the covert operator as a substantially discontinuous reflection of the one or more of the series of transmission signals.

12. The method of claim 10, wherein the covert transmission signal is generated by manipulation of an antenna included in the covert operator.

13. The method of claim 10, further comprising:
applying a cancellation algorithm using a representation of the direct transmission signal from the transmitter to reduce a direct path interference of the composite signal and generate a reduced direct path interference signal.

14. The method of claim 10, further comprising:
selecting the predetermined code such that the covert transmission signal is substantially indistinguishable from clutter.

* * * * *